Figure 1:
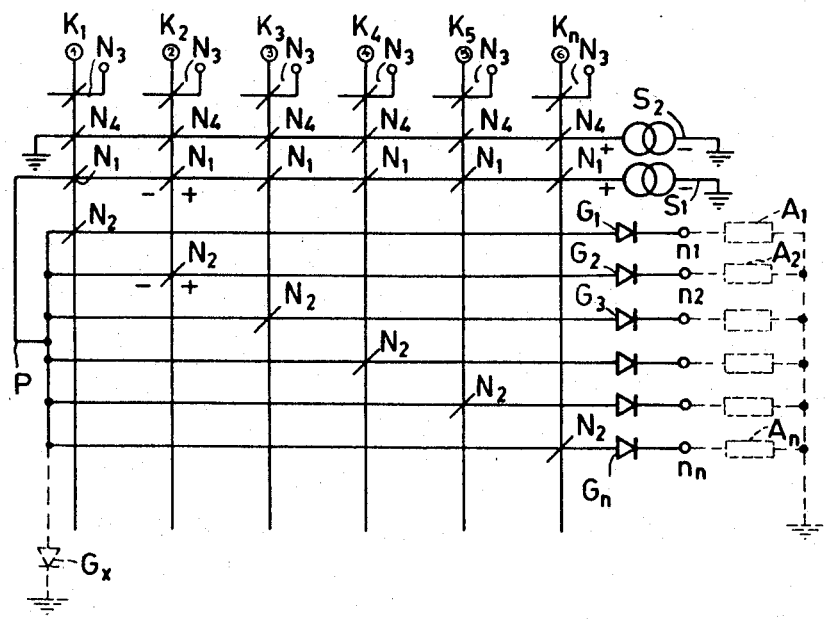

INVENTOR.
PETER BLUME
AGENT

United States Patent Office 3,444,389
Patented May 13, 1969

3,444,389
MAGNETIC CORE COMMUTATOR CIRCUIT
Peter Blume, Hamburg-Lurup, Germany, assignor, by mesne assignments, to U.S. Philips Corporation, New York, N.Y., a corporation of Delaware
Continuation of application Ser. No. 413,914, Nov. 25, 1964. This application Apr. 4, 1966, Ser. No. 539,942
Claims priority, application Germany, Jan. 30, 1964, P 33,495
Int. Cl. H03k 17/80
U.S. Cl. 307—88                                 5 Claims This application is a continuation of my prior application Ser. No. 413,914, filed Nov. 25, 1964, now abandoned.

The invention relates to a magnetic core commutator circuit.

A magnetic core commutator circuit is known which comprises a plurality of cores of magnetic material having a rectangular hysteresis loop, in which a current pulse generator is connected, through a series combination of read-out windings on each core, to a plurality of series circuits which are individually associated with the various cores and each comprises an output winding provided on the associated core, a rectifier and a load. In this commutator circuit each of the cores is further provided with an input winding for setting the cores to a desired magnetic remanence condition by means of a pulse applied through the associated input winding.

This commutator circuit works as follows. When one of the cores is in a particular operative remanence condition it will be driven to the opposite rest remanence condition under the control of a pulse from the pulse generator so that in the output winding of this core there is produced an induction voltage such that the associated rectifier becomes conductive and an output current flows through the load. If, now, the duration of the current pulse from the pulse generator is longer than the switching time required to set the core from the working condition to the rest condition, the induction voltage collapses before the current pulse is terminated so that the remainder of the current pulse will be distributed over the various individual series circuits including the individual loads of the cores, which in general is undesirable. To obviate this disadvantage, in the known commutator circuits a rectifier is connected in parallel with the various individual series circuits, which rectifier after the collapse of the induction voltage offers a short circuit across the said series circuits and conducts away the remainder of the current pulse.

This method, however, has several disadvantages. In practice the impedances of the loads of the individual circuits may be comparatively low (for example, if the loads take the form of control windings of a memory matrix controlled by the commutator circuit) and furthermore a conductive rectifier still offers a certain finite internal resistance so that part of the remainder of the current pulse will still flow through the individual circuits. Another disadvantage consists in that the value of the pulse flowing through the load of the switched core is not solely determined by the pulse from the pulse generator since, as mentioned hereinbefore, part of this pulse flows away by another path, but this output pulse also depends upon the incidental properties of the core and hence is not well defined, as is desired in practice.

The present invention obviates the said disadvantage. In the magnetic core commutator circuit in accordance with the invention the duration of the pulses from the current pulse generator is shorter than the switching time required to cause the cores to flip over from a particular working condition to a particular rest condition. Each of the cores is provided with a fourth winding and all of the fourth windings are connected in series with one another to a second pulse generator the pulses of which are active at least on termination of the pulses of the first pulse generator so as to set the cores to the particular rest condition.

Figure 2:
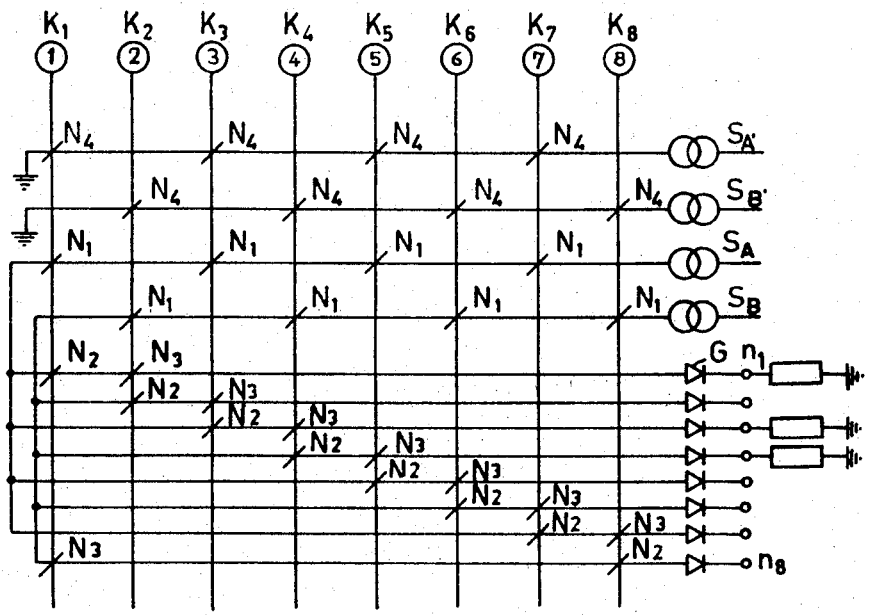
Figure 3:
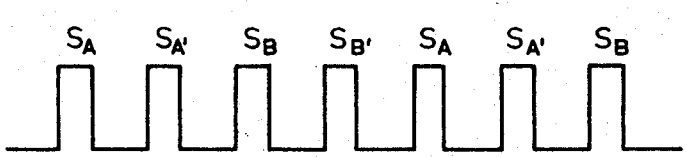

In order that the invention may readily be carried out, embodiments thereof will now be described, by way of example, with reference to the accompanying drawings, in which:

FIG. 1 is a circuit diagram of a commutator circuit in accordance with the invention, FIG. 2 is a circuit diagram of a shift register in accordance with the invention, and FIG. 3 is a diagram illustrating the operation of this shift register.

In FIG. 1 a magnetic core commutator circuit comprises a plurality of cores $K_1$, $K_2$ ... $K_n$ which are made of magnetic material having a rectangular hysteresis loop and are shown by vertical lines. Each core is provided with a read-out winding $N_1$, an output winding $N_2$ and an input winding $N_3$, these windings being shown in known manner as oblique lines. The read-out windings are connected in series with one another to a current pulse generator $S_1$. The other end of the series combination is connected to the parallel combination of a plurality of circuits which are each associated with a separate core and each comprise the output winding $N_2$ of the associated core, a rectifier $G_1$, $G_2$ ... $G_n$ and a load $A_1$, $A_2$ ... $A_n$, respectively. The pulses produced by the generator $S_1$ have a polarity such that they act in the pass direction of the rectifiers. The read-out windings $N_1$ comprise a greater number of turns than the output windings $N_2$ and are so connected, that the magnetic effect on the cores $K_1$ ... $K_n$ of a current flowing through the windings $N_1$ is opposite to that of a current flowing through the windings $N_2$.

The arrangement described so far is known and operates as follows.

It is assumed that one of the cores, for example, the core $K_2$, has been set to the working remanence condition by a pulse applied through the associated input winding $N_3$. The next subsequent pulse applied to this core by the pulse generator $S_1$ through the read-out winding $N_1$ has the effect of magnetically driving this core towards the rest remanence condition so that in the output winding $N_2$ of this core an induction voltage is produced the polarity of which is shown in the drawing.

Under the control of this induction voltage the rectifier $G_2$ becomes conductive and the pulse from the pulse generator $S_1$ is transmitted, through the series connection of the windings $N_1$, the winding $N_2$ on the core $K_2$ and the rectifier $G_2$, to a load $A_2$ which may take the form, for example, of a control winding of a memory matrix (not shown).

The amplitude of the induction voltage set up across the winding $N_2$ on the core $K_2$ exceeds the voltage drop produced across the rectifier $G_2$ and the load $A_2$ so that a point P has a negative potential with respect to earth. Since furthermore across the windings $N_2$ of the remaining cores no induction voltage is produced, the rectifiers $G_1$, $G_3$ ... $G_n$ associated with the other cores are biased in the reverse direction so that no currents can occur in the respective output loads as long as the induction voltage is set up across the winding $N_2$ of the core $K_2$.

Hence, if, as is the case in the known arrangement, the switching time of the cores is shorter than the pulse duration, the induction voltage and consequently the negative bias of the remaining rectifiers will collapse before the pulse terminates. As a result the remainder of the pulse will be distributed over the various circuits or, in the known arrangement, is conducted away through a rectifier $G_x$ shown by broken lines, however, as stated hereinbefore, this involves several disadvantages one of which is that the pulse applied to the output load $A_2$ is smaller than the pulse produced by the generator $S_1$ and hence is dependent upon the properties of the core.

In an ideal case the duration of the pulses is equal to the switching time of the cores. However, in practice this is impossible because the switching times of different cores are different.

According to the invention the duration of the pulses produced by the current generator $S_1$ is shorter than the switching times of the cores. This ensures that the entire pulse produced by the generator is applied to the load $A_2$ and consequently the output pulse has a well defined value.

In this case, however, the core $K_2$ is not entirely reset to the rest remanence condition under the control of the pulses from the generator $S_1$. This may result in that on the occurrence of a subsequent pulse, which switches another core, a certain induction voltage will still be set up across the winding $N_2$ on the core $K_2$ so that part of the current pulse will flow away through the rectifier $G_2$ and the load, which is undesirable.

To obviate this disadvantage each core is provided with a fourth winding $N_4$ and these windings are connected in series with one another to a second pulse generator $S_2$ which produces pulses which at least are active after termination of the pulses from the generator $S_1$. For example, the pulses from the generator $S_2$ may be applied only after the pulses from the generator $S_1$ have completely terminated, but in principle the former may alternatively overlap the latter entirely or partially. The essential feature is only that after the pulses from the generator $S_1$ have terminated the generator $S_2$ still carries a current by which the switched cores are entirely reset to the rest remanence condition. Although during the pulse from the generator $S_2$ an induction voltage is again set up across the winding $N_2$, an induction voltage is also produced across the winding $N_1$ on the core and this voltage has a direction opposite to that across the winding $N_2$ and furthermore, owing to the fact that the number of turns of $N_1$ is greater than that of $N_2$, is greater than the voltage across $N_2$. Thus the rectifiers are biassed in the reverse direction. In addition, the generator $S_1$ has a high internal resistance, which is another reason why no currents can flow through the loads.

FIG. 2 shows a shift register including two groups of cores $K_1$, $K_3$, $K_5$, $K_7$ and $K_2$, $K_4$, $K_6$, $K_8$ respectively, the associated circuits each corresponding to that shown in FIG. 1.

A current pulse generator $S_A$ is connected through the series combination of the windings $N_1$ on odd-numbered cores $K_1$, $K_3$, $K_5$ and $K_7$ to the parallel connected individual circuits of these cores, however, each of these circuits includes, in addition to the output winding $N_2$, a rectifier G and a load A, the input winding $N_3$ on the next higher even-numbered core $K_2$, $K_4$, etc., respectively. Similarly, each individual circuit of the even-numbered cores $K_2$, $K_4$, $K_6$ and $K_8$, the read-out windings $N_1$ of which are connected in series with one another to a generator $S_B$, includes an input winding $N_3$ on an odd-numbered core. Furthermore the windings $N_4$ of the odd-numbered cores are connected in series with one another to a generator $S'_A$, and the windings $N_4$ on the even-numbered cores are connected in series with one another to a generator $S'_B$. The generators $S_A$ and $S_B$ correspond to the generator $S_1$ of FIG. 1 and the generators $S'_A$ and $S'_B$ to the generator $S_2$ of FIG. 1.

Pulses are generated by the generators in the sequence $S_A$, $S'_A$, $S_B$, $S'_B$, $S_A$, and so on, as is shown in FIG. 3.

If now one of the cores is set to the working condition it will be reset to the rest condition under the control of the relevant pulses. By the pulse appearing in the respective individual circuit the next core is set to the working condition through the input winding $N_3$. Thus, the working condition is transmitted by the pulses from one core to the next and at the same time pulses are applied to the various output loads in the same sequence. Consequently the shift register may be used as a pulse distribution switch the output pulses of which have exactly defined values.

What is claimed is:

1. A commutator circuit comprising a plurality of substantially rectangular hysteresis loop magnetic cores each having, readout, output and input windings coupled thereto, each of said cores being switchable from its original remanent condition in response to the presence of a signal on said input winding, means for serially connecting said readout windings between a first pulse source and one end of each of said output windings, a plurality of rectifiers, each of said rectifiers interconnecting the other end of said output winding to a load means, said first pulse source producing a pulse having a duration less than that required to restore the original remanent state of said cores, each of said cores including a further winding coupled thereto, and means for serially connecting said further windings to a second pulse source, said second pulse source producing a pulse having a duration such that the total duration of said first and second pulse source pulses is sufficient to restore the original remanent state of any of said cores.

2. The combination of claim 3 wherein each of said rectifiers are connected so as to be provided with forward bias by the polarity of pulses produced by said first pulse source.

3. The combination of claim 3 wherein said readout winding produces a greater amount of magnetic flux in a respective core than said output winding in response to said first pulse source pulse, said readout winding and said output winding being wound on said core so as to produce oppositely sensed magnetic flux.

4. The combination of claim 3 wherein said second pulse source pulse initiates upon the termination of said first pulse source pulse.

5. Apparatus comprising: a plurality of substantially rectangular hysteresis loop magnetic cores each having readout, output and input windings coupled thereto, each of said cores being switchable from its original remanent condition in response to the presence of a signal on any of said input windings, said plurality of cores being divisible into first and second groups of cores, means for serially connecting those readout windings associated with said first group of cores between a first pulse source and a first plurality of series circuits, each of said circuits including an output winding associated with said first group, an input winding associated with said second group, a rectifier and a load means, means for serially connecting those readout windings associated with said second groups of cores between a second pulse source and a second plurality of series circuits, each of which includes an output winding associated with said second group, an input winding associated with said first group, a rectifier and load means, each of said plurality of cores including a further winding coupled thereto, means for serially connecting those further windings associated with said first group to a third pulse source and means for serially connecting those further windings associated with said second group to a fourth pulse source, said first pulse source producing a pulse having a duration less than that required to restore the original remanent state of any of said first group of cores, said third pulse source producing a pulse having a duration such that the total duration of said first and third pulse source pulses is sufficient to restore the original remanent state of any of said first group of cores, said second pulse source producing a pulse having a duration less than that required to restore the original remanent state of any of said second group of cores, said fourth pulse source producing a pulse having a duration such that the total duration of said second and fourth pulse source pulses is sufficient to restore the original remanent state of any of said first group of cores.

References Cited

UNITED STATES PATENTS

| 2,719,961 | 10/1955 | Karnaugh | 340—174 |
|---|---|---|---|
| 3,268,736 | 8/1966 | Marcus | 307—88 |

BERNARD KONICK, *Primary Examiner.*

S. COKOTILOW, *Assistant Examiner.*

U.S. Cl. X.R.

304—174